(No Model.)
M. O. BALDWIN.
CAR WHEEL.
No. 276,211. Patented Apr. 24, 1883.
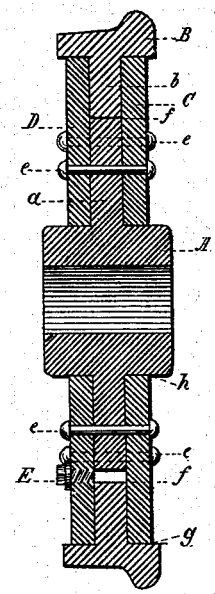
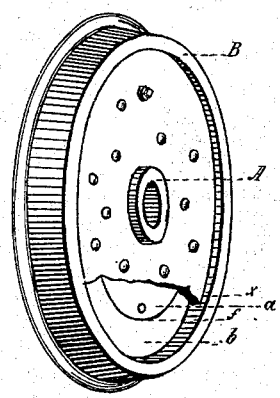
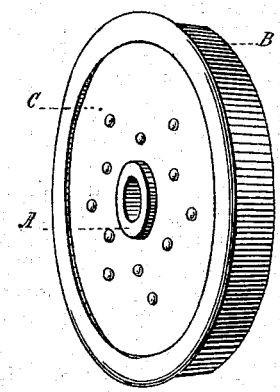
Witnesses:
T. B. Jewell
W. H. Shearer
Inventor
Marcellus O. Baldwin, M.D.

UNITED STATES PATENT OFFICE.

MARCELLUS O. BALDWIN, OF KANSAS CITY, MISSOURI.

CAR-WHEEL.

SPECIFICATION forming part of Letters Patent No. 276,211, dated April 24, 1883.

Application filed November 14, 1882. (No model.)

*To all whom it may concern:*

Be it known that I, MARCELLUS O. BALDWIN, of Kansas City, in the county of Jackson and State of Missouri, have invented a new and useful Improvement in Duplex Car-Wheels; and I do hereby declare that the following is a full, clear, and exact description thereof, which will enable others skilled in the art to make and use the same, reference being had to the accompanying drawings, forming part of this specification.

My invention has for its object a car-wheel so constructed that one part of the wheel shall rotate on its axis independently of and in the same plane with the other part, at a near distance to the tread, to permit an escape of the débris and overcome the friction in describing the curves in the track; and it consists in the novel combination and arrangement of parts hereinafter more fully described, and specifically pointed out in the claim.

In the drawings, Figure 1 is a transverse sectional elevation of the wheel. Fig. 2 is a perspective view of the inner side of the wheel, which is broken at $x$ to show construction. Fig. 3 is a perspective view of the outer side of the wheel.

A represents a collar or hub of a car-wheel, and $a$ an extension of the same.

B is the tread of the wheel, having an inner circular flange, $b$.

C is an outer side plate.

D is an inner side plate.

$e\ e$ are bolts passing through and securing extension $a$ of collar A and side plates, C D, firmly together.

$f$ represents the annular space between flange $b$ on tread B and extension $a$ of collar A, in which free rotation between the web and tread is permitted.

$g$ represents the annular space between the side plates and the tread of the wheel.

$h$ represents the circular portion removed from plates C and D to fit over collar A.

E is an oil-cup passing through side plates D and extension $a$ of collar A.

In the construction of my improved wheel I form the collar or hub with a circular extension, $a$, which may be cast with the collar or hub or shrunk on to unite them, and serve the purposes of the invention. The extension $a$, I make of sufficient length to give rigidity to the web of the wheel and space for an alternating series of bolts, $e\ e$, which pass through it.

In the construction of the tread B of the wheel I form on the inner side a short circular flange, $b$, of the same width as the extension $a$ of collar A, and adapt it to fit smoothly over and rotate upon the periphery of said extension. The wheel in the drawings is broken at $x$ to show this construction. Two circular side plates, C and D, made equally longer than the extension $a$, to form an annular recess between them, are now fitted to pass over the hub at $h$, on opposite sides, and within the inner sides of the tread of the wheel at $g$, through which plates and extension of collar or hub A bolts $e\ e$ are fitted, and securely riveted on the outer sides.

Instead of forming two side plates and attaching them to the extension $a$ of collar A, I may form either one of the side plates and the extension $a$, with the collar A, in one piece, attaching the opposite side plate after the flange $b$ of tread B has been arranged in place.

An oil-cup, E, is arranged to pass through the outer plate in either a horizontal or inclined plane, and also through the extension $a$ of collar A at the point of rotation. Thus lubrication of all the wearing-surfaces is at once attained.

The advantages of my invention will be readily seen. The two independent parts of the wheel, in describing the curves in the track, especially in a mountainous country, and in the use of the air-brakes upon steep grades, double their services, and thereby increase the friction and wear of the surfaces.

I am aware that car-wheels have been constructed to relieve the sliding of the wheel in describing the curves in the track; but in these devices the débris is not permitted to escape, and is retained, which cuts and destroys the wheel, and will retard the action of the same.

In my invention the accumulations may be continually permitted to escape, while the liability to bind from overheated and confined surfaces is avoided.

I am enabled, also, in the construction of the invention to widen the outer plates and strengthen the wheel through the web, in which the side plates are adjusted to play freely upon the inner portion of the tread of the wheel, and to also combine the parts so as to avoid bolting at the weakest points, between the hub and tread, that sustain lateral strain, and thereby add strength and utility to the device.

Having fully described my invention, what I claim as new, and desire to secure by Letters Patent, is—

A car-wheel composed of two independently-rotating parts, one of said parts having a circular inner plate attached rigidly to and extending from the hub radially across the web of the wheel, and circular side plates extending in a parallel relation with and beyond said inner plate to the inner surfaces of the tread of the wheel, said plates forming part of or being removably attached to said inner plate, as described.

In testimony that I claim the foregoing as my own I affix my signature in presence of two witnesses.

MARCELLUS O. BALDWIN.

Witnesses:
T. B. JEWELL,
W. H. SHEANER.